United States Patent [19]

Steinmann

[11] 4,002,219

[45] Jan. 11, 1977

[54] AUTOMATIC SAFETY BELT SYSTEM, PARTICULARLY FOR VEHICULAR, ESPECIALLY AUTOMOTIVE USE

[75] Inventor: Helmut Steinmann, Baden-Baden, Germany

[73] Assignee: Robert Bosch GmbH, Stuttgart, Germany

[22] Filed: Feb. 24, 1976

[21] Appl. No.: 660,857

[30] Foreign Application Priority Data

Mar. 15, 1975 Germany ............................ 2511442

[52] U.S. Cl. ............................. 180/82 C; 242/107; 242/107.4 R; 280/744
[51] Int. Cl.² ........................................ B60R 21/00
[58] Field of Search ................. 180/82 C; 280/744; 242/107 R, 107.4 R; 200/61.58; 297/388

[56] References Cited

UNITED STATES PATENTS

| 2,905,231 | 9/1959 | Olson | 280/744 |
| 3,771,742 | 11/1973 | Okada | 242/107.4 R |
| 3,880,364 | 4/1975 | Andres | 180/82 CX |
| 3,912,035 | 10/1975 | Ulert | 280/744 X |

FOREIGN PATENTS OR APPLICATIONS

| 1,756,657 | 4/1970 | Germany | 280/744 |
| 2,302,541 | 7/1974 | Germany | 280/744 |
| 1,390,017 | 4/1975 | United Kingdom | 280/744 |

Primary Examiner—Joseph F. Peters
Assistant Examiner—Terrance L. Siemens
Attorney, Agent, or Firm—Flynn & Frishauf

[57] ABSTRACT

To provide for essentially uniform tension of a safety belt extended by a user from a belt supply, a roll-up motor is mechanically, serially connected to a spring housing which includes a spiral spring, to which one end thereof is attached, the other end of the spring being attached to the shaft of the belt roll-up unit. A traveling nut is threaded on the shaft of the roll-up unit, axial movement of which is sensed by a three-position switch which controls the motor to pay out more, or take up some belt if the tension on the belt does not fall within the tension as set by the spring and controlling a center-OFF position of the three-position switch. Roll-up operation of the motor is started by a current pulse supplied from a latch switch incorporated in the engaging latch of the belt and abruptly changing state upon disengagement of the belt from the latch.

17 Claims, 4 Drawing Figures

AUTOMATIC SAFETY BELT SYSTEM, PARTICULARLY FOR VEHICULAR, ESPECIALLY AUTOMOTIVE USE

The present invention relates to a passenger restraint, and more particularly to a safety belt, especially for automotive vehicles, in which an electrically driven wind-up reel coupled to a spring is used, the spring providing a certain resilient bias of the belt against the body of the user.

Safety belt arrangements of the type to which the present invention relates have previously been proposed (see German Disclosure Document DT-OS No. 2,220,669 to which U.S. Pat. No. 3,880,364 corresponds). This arrangement uses a servo drive in which a spring-loaded shaft is driven by an electric motor. The spring is used over its entire working range and provides a bias of the belt towards the body of the user when the motor has been disconnected. This arrangement has a certain disadvantage; it requires a clutch, as disclosed a magnetic clutch, between the electric motor and the bias spring. This clutch is frequently engaged ON and disengaged OFF. The high switching frequency results in high wear and tear and, additionally, in operating noise which is an acoustic annoyance to the user of the system. Manufacture and assembly of the required spring causes difficulty and undue cost. The spring needed must have a flat characteristic over a wide operating range, that is, over a wide deflection range since the spring is in engagement with the belt in parallel to the electric drive throughout the entire adjustment range of the belt.

It is an object of the present invention to provide a safety restraint, and more particularly a safety belt in which an electric roll-up drive is provided, and which requires much less electrical as well as mechanical apparatus, which has a high operating reliability and is essentially immune to malfunction in spite of interfering extraneous influences, while not presenting an annoyance to the user. Particularly, the arrangement should permit the user to move the vehicle seat between extremes in position without change in the bias force of application of the belt against the user and should operate essentially silently, that is, without acoustic annoyance due to switching of mechanical clutches and other devices.

Subject matter of the present invention

Briefly, the drive provided by an electric motor and the biassing spring are mechanically connected in series. The spring can be operated within a level part of its characteristic independently of the length of withdrawal of the belt from the belt roll-up device. The series connection of the motor drive and of the spring permits elimination of clutches and the like, so that acoustic annoyance for the user of the belt, due to repeated clutch operation, is completely eliminated. The operating point of the safety belt can be so adjusted, with respect to the resiliency characteristic of the spring, that an inexpensive simple and reliable spring can be used since only a portion of its resiliency characteristic is actually utilized by movement of the user. A standard automatic roll-up device of known construction can be used which has the electric motor drive added thereto only to wind up the belt on the belt supply roller. The only additional requirements are a control circuit for the motor. The system operates always in the same range of the resiliency characteristic of the spring so that the operating effect on the user is the same regardless of the position of the seat with respect to the attachment of the belt. Thus, any adjustment of the seat position will still provide the belt, from its fixed attachment point, with constant bias force, which bias force can be so selected that it is considered acceptable and comfortable by the user.

The invention will be described by way of example with reference to the accompanying drawings, wherein.

Figure 3:
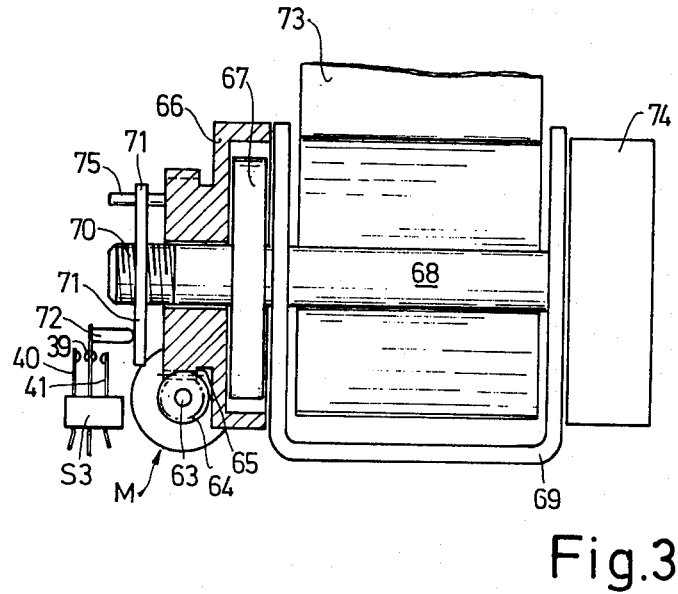
FIG. 3 is a schematic longitudinal section of one form of drive for the belt system.
Figure 4:
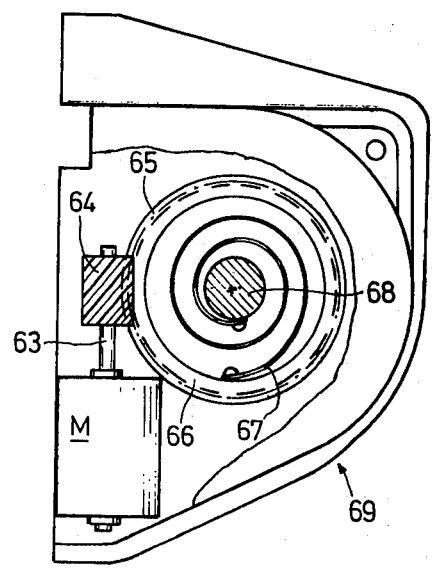
FIG. 4 is a top view of the combined electric motor drive and holding spring arrangement for the safety belt.

Referring first to FIGS. 3 and 4: M is an electric motor having a shaft 63 which has a worm wheel 64 formed thereon, engaging a worm gear 65 formed on a spring housing 66. The worm wheel 64 and gear 65 together form a worm drive which is so arranged that it is self-locking, that is, that power can be transmitted only from a shaft 63 to the gear 65, but not in the other direction. This worm drive is provided in order to set the working point of a spring 67 located within the housing 66.

Spring 67 is a spiral spring secured with one end, as best seen in FIG. 4, to a shaft 68 and, with its other end, on housing 66. A belt roll-up device 69 is also seated on shaft 68. The end of the shaft 68 which extends beyond the housing 66 is threaded at 70. The threaded portion 70 has a traveling nut 71 secured thereto. Nut 71 operates a switch S3 which has three positions. Center contact 39 of switch S3 may be either open, or closed alternately, to either one of contact blades 40, 41. The switch S3 is operated by means of a cam follower 72 connected to center contact blade 39. Cam follower 72 is engaged by the traveling nut 71 which is restrained against rotation by a holding pin 75. A free overrun must be provided for the center contact 39 so that the contact blades of the center contact 39 as well as of the two fixed contact terminals 40, 41 are not bent upon excessive excursions of nut 71.

The restraining belt 73 is held on the take-up roller 69. The end of the belt 73 and the take-up roller 69 are rigidly coupled to the shaft 68. Shaft 68 additionally has an impact or inertia lock 74 attached thereto which locks belt 73 in case of impact, e.g. due to an accident. This lock 74 is conventional and may be similar to customary locks used in large numbers on existing automotive vehicles and available as standard articles of commerce.

Spring 67 coupled to shaft 68 provides a bias force for the belt 73 against the body of the user in order to provide optimum safe operation. The electric motor drive consisting of motor M, shaft 63, the self-binding worm gear drive 64, 65 and the housing for spring 66 as well as the holding spring 67 for the take-up roller 69 are all connected, mechanically, in series. Spring 67 operates independently of the length of withdrawal of the belt, and thus is used throughout an approximately uniform range of its resiliency characteristic. A control system, which will be described in detail in connection with FIGS. 1 and 2, in combination with the switch S3, provides for operation of motor M to rotate the spring housing, so that the spring, when actually used, will be stressed to a predetermined level regardless of the length of withdrawal of the belt and independently of the position of the seat of the user in a vehicle, for example in an automotive vehicle, with respect to the fixed position of the belt take-up device. Thus, the spring will always operate at a predetermined fixed center point, defining an essentially uniform range of its spring resiliency characteristic. If the seat of the user of the belt is pulled forwardly, then motor M will be controlled (as will appear) to pay out more belt length than if the seat is pushed backwards with respect to the attachment point of the belt roll-up device. Control of the motor is effected by the three-position switch S3 in dependence on the stress of the spring 67. As the spring is stressed, or relieved, shaft 68 causes travel of the traveling nut 71. If the stress on the spring is too little, or too great, then either one of contacts 40, 41 will be engaged by the center contact 39 which will close the control circuit to the motor M in a direction to either pay out more belt length, or to take up some belt length, until the desired spring position, and hence spring characteristic of spring 67 has been reached.

FIG. 4 clearly shows attachment of spring 67 with its inner end on shaft 68 and with its outer end on the spring housing 66. Spring housing 66 is rotatable with respect to shaft 68. Spring housing 66, in gear driven engagement with worm wheel 64, is driven by motor M. Pin 75, secured to the spring housing 66, restrains rotation of nut 71 and hence provides for axial travel thereof. The self-binding, unidirectional drive 64, 65 provides for rotation of shaft 68 as belt 73 is pulled off roll-up device 69, thus stressing the spring 67. Upon rotation of shaft 68, nut 71 is moved towards the left (FIG. 3). When contacts 39, 40 of switch S3 engage, the switch will cause, by the control circuit to be described, connection of the motor M to drive the motor in a direction to pay out belt 73. Drive of the roller 69 is effected by interposition of the spring housing 66 and of spring 67.

Operation, if spring 67 is excessively stressed

Let it be assumed that belt 73 is reeled off. Initially, spring 67 will be excessively stressed which causes rotation of shaft 68 so that the traveling nut 71 will move from the center position, as shown in FIG. 3, to one of the contacts 39, 40 which causes operation of the motor control in such a direction to supply current to motor M to effect rotation and permit additional supply of belt webbing 73 until spring 67 will not be excessively stressed anymore and permit return of the nut 71 to its neutral position. This neutral position of the center contact 39 will be obtained when the shaft 68 continues to rotate, and spring 67 is stressed less and less. If, on the other hand, too much belt is pulled off spring 67 will no longer have its previously programmed tension. This causes excursion of the nut 71 in the other direction, for example to the right, to close contacts 39 and 41. This causes driving of the motor in the direction opposite to that causing contacts 39 and 40 to become engaged. As the motor turns in opposite direction, belt 73 is wound up until, again, the nut 71 reaches its position corresponding to center position of contact 39, and disconnection of motor M.

Figure 1:
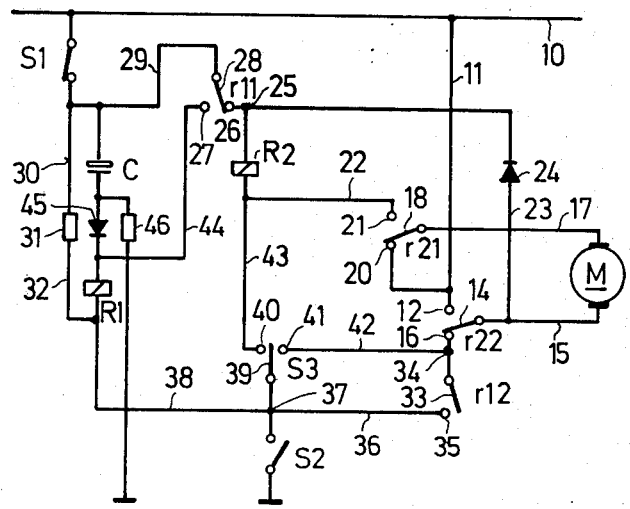
FIG. 1 illustrates one form of control circuit for the belt arrangement with a mechanical end limit position switch.
Figure 2:
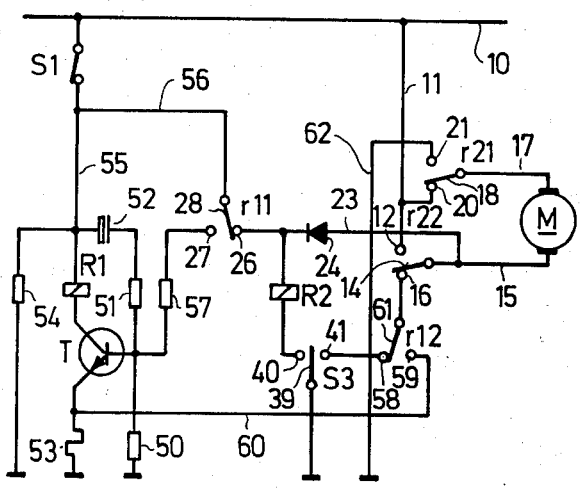
FIG. 2 illustrates another embodiment having an electronic limit position switch.

The motor is, therefore, basically controlled by the switch S3. The control network is shown in FIGS. 1 and 2, to which reference will now be made.

A positive supply line 10 supplies electrical power. Line 11 connects the working contact 12 of a switch-over relay r22 to line 10. The movable contact 14 of relay r22 is connected over line 15 with the motor M. This motor M may be a permanent magnet (PM) motor. Contact 16 of the relay r22 is the normally closed contact of the relay.

The second terminal of the motor M is connected over line 17 with the movable contact 18 of a switch-over relay r21. The switch-over relay terminal r21, as well as the switch-over relay terminal r22, are both operated by winding R2. Contact 20 is the normally closed contact of relay r21. The working contact 21 that is, the contact which is engaged by the switch-over terminal 18 when the relay is energized is connected over line 22 with the winding R2. A branch 23 branches off line 15. A diode 24 is connected in line 23, pole to be in conductive direction. Line 23 ends at a junction 25. Junction 25 has electrical lines connected on the one hand to winding R2 and, on the other, to the normally closed terminal 26 of a switch-over relay contact set r11. The relay contact set r11 has the operating contact 27 and the movable switch-over terminal 28, which is connected over line 29 to a switch S1. Switch S1 connects to the positive supply bus 10. The switch S1 is connected to the latch for the belt 73. It will be referred to as a latch switch.

The latch switch S1 has its movable contact connected to the electrical supply bus 10. Its fixed contact is connected over line 30 with a resistor 31, the opposite terminal of which is connected to line 32 and then to one terminal of the relay winding R1, which operates the relay switch-over terminal set r11. Relay winding R1 additionally operates a relay closing terminal set r12 having a movable terminal 33. The movable terminal 33 is connected over junction 34 with the normally closed terminal 16 of the switch-over relay r22. The fixed contact 35 of the closing terminal r12 is connected over line 36 with a junction 37 from which a line 38 connects to that terminal of the relay winding R1 which is also connected to line 32.

Junction 37 is additionally connected to the fixed contact of a mechanically operable switch S2. Switch S2 is a limit switch and connected to the belt assembly of FIGS. 3 and 4, not shown therein. The movable contact of the terminal S2 is connected to ground or chassis of the vehicle.

The center contact 39 of switch S3 (see also FIG. 3) is connected to the junction 37. The center position of the switch S3 is stable. Upon lateral deflection of the center terminal 39, due to excursion of the nut 71, either one of the terminals 40, 41 will be engaged so long as operating force is applied to the center terminal 39. Fixed terminal 41 is connected over line 42 with junction 34. Fixed contact 40 is connected over line 43 to that terminal of relay winding R2 to which line 22 is also connected. Switch S3 is termed herein as the spring control switch.

The terminal of relay winding R1 which is remote from lines 32 and 38 is connected over line 44 to the working terminal 27 of the switch-over relay assembly r11, and further to the cathode of a diode 45. The anode of diode 45 is connected to a resistor 46 which is connected to ground with its other terminal; additionally, the anode of diode 45 is connected to a capacitor C and then to the line 29 which is connected over the belt latch switch S1 to the supply bus 10. The supply bus 10 is connected, for example, to the positive terminals of the battery of an automotive vehicle supplying for example, 12 V nominal.

Operation of control circuit, with reference to FIGS. 1 and 3

Let it be assumed that, initially, the belt 73 is completely rolled on the roll-up unit 69. Starting from this position, as belt 73 is pulled off, the end switch S2 is connected. Due to pulling off of the belt, and rotation of shaft 68, nut 71 will move towards the left, causing closing of terminals 39, 40. This closes the circuit of relay winding R2 over the closed latch switch S1, the normally closed (NC) terminal 26 of the relay switches r11, the center terminal 39 of switch S3 and the closed end limit switch S2. Current can flow from the supply line 10 over relay winding R2 to chassis. This causes change-over of the relay switches r21, 22. As a result, the circuit through motor M is closed and current will flow through the motor M in a direction to cause rotation thereof to pay out webbing of belt 73.

The circuit of the motor is closed as follows

Lines 10, 11, movable contact 14, lines 15, 17, movable contact 18, lines 22 and 43, contact 40 and center contact 39 of spring control switch S3, and the closed limit switch S2 to chassis.

Relay R1 cannot pull in although the belt latch switch S1 is closed since the capacitor C has previously been charged over the belt latch switch s1 and the resistor 46. This provides a counter voltage, inhibiting current flow through relay winding R1. The position of the belt latch switch in FIG. 1 is the position which the switch is in when the latch for the belt is not engaged, that is, in which it is closed. Upon engagement of the latch of the restraining belt 73, the switch will open.

Upon engagement of the latch of belt 73, belt latch switch S1 will open. Relay R2 remains energized over diode 24 and the holding contact r22 as long as the motor drive provides enough length of belt 73 to obtain a predetermined biassing of spring tension of the spring 67. When the predetermined spring tension is reached, the traveling nut 71 (FIG. 3) will move towards the right and the average predetermined tension of the spring corresponding to the center position of the switch S3 will be obtained. This prevents complete stressing of the spring even upon rapid pull-off of the belt and retention of this heavy spring tension upon possible premature disconnection of the motor. When the center position of spring control switch s3 is reached, current is interrupted for relay winding R2. Any movement of the belt by the user, that is, when the belt has been engaged, will be controlled only by the bias tension of the spring. If this bias tension exceeds, or falls below the nominal tension of the spring, as determined by the center position of the switch blade 39 (see FIG. 3, and operation of motor), the belt will be re-tightened, or loosened, respectively, so that the average spring tension position as controlled by the spring control switch S3 will remain. The string control switch S3 will thus continue to supervise tension of the belt 73. Tightening to the average spring position is continuously possible by movement of the nut 71 to control the spring control switch S3 until the center contact 39 again assumes the open position, as shown in FIG. 3, that is, the quiescent position and hence connection of the terminal assemblies r21 and r22 to their NC position. Any possibly excessively paid-out belt 73 thus does not have to be re-spooled, or retrieved, and held by spring tension, but rather under control of the motor which, as specified, is selectively energized by excursion of the nut 70 and consequential operation of the spring control switch S3.

Upon removal of the belt from latched position, switch S1 is again closed. Capacitor C previously had discharged over resistors 31, 46 and the limit switch S2. Upon closing of the switch S1, a charge pulse is applied over capacitor C and limit switch S2 which is sufficient to energize relay winding R1 and cause pull-in of the terminal assembly r11. The movable switch thereof changes to the NO working contact 27 so that the circuit of relay winding R1 will remain closed, that is, the self-holding terminals are closed. The closed switch S1 and contact 28, as well as working contact 27 of the change-over switch assembly r11 and the closed limit switch S2 provide for the closed circuit. The belt positioning circuit as controlled by the spring control switch S3 is disconnected by the relay terminal r11. Yet, motor M is energized to wind up the belt by the circuit: switches r21, r22 in NC position, movable contact 33 of terminal r12 and closed limit switch S2. When the limit switch S2 indicates that the belt has been would fully on its wind-up roller, it will respond, and open; this then disconnects the motor.

The control system of FIG. 2 is similar to principle to that of the system explained in FIG. 1. Rather than providing a mechanical limit switch S2, indicating that the belt is either fully wound on the roll, or not, an electronic limit switch is provided which, as shown, uses a transistor T in place of the mechanical limit switch S2. It senses when motor M has wound belt 73 on its wind-up unit 69.

The base of transistor T is connected to chassis over resistor 50 on the one hand and over a resistor 51 to a capacitor, on the other. It is additionally connected to positive bus 10 over the belt latch switch S1 which, as above, is closed when the latch is open, that is, when the belt is not engaged therein. The emitter of transistor T is connected to chassis over a low-resistance resistor 53. The collector of transistor T is connected to one terminal of relay winding R1, the other terminal of which is connected over a high-resistance resistor 52 to ground or chassis. The same terminal of the relay winding R1 is further connected over the belt latch switch S1 with the supply bus 10 and further is connected to the electrode of the capacitor 52 which is opposite that electrode connected to the base of the transistor T.

A connecting line 55 between the relaywinding R1 and the latch switch S1 has a branch 56 extending therefrom connecting to the movable switch terminal 28 of the transfer relay contacts r11. The normally open (NO) terminal 27 is connected over resistor 57 to the base of transistor T. The NC terminal 26 is connected as in the arrangement of FIG. 1 to the cathode of the diode 24 as well as to one terminal of relay winding R2. The other terminal of relay winding R2 is connected to the left fixed terminal 40 of the spring position switch S3. The center contact 39 of spring position switch S3 is connected to ground or chassis. The right fixed terminal 41 of spring position switch S3 is connected to the NC contact 58 of the switch-over relay terminals r12. The terminals r12 are switch-over terminals in the arrangement of FIG. 2. The NO terminal 59 of the switch-over terminals 59 is connected over line 60 to the emitter of transistor T. The movable contact 61 is connected over the NC terminal 16 and the movable terminal 14 of the switch-over relay r22 on the one hand to diode 24 and, on the other, to one of the terminals of motor M. The other terminal of motor M is connected to the movable contact 16 and the NC contact 20 of the switch-over relay r21 and to the electrical supply bus 10. The movable contact 21 of the switch-over element r21 is connected to ground or chassis by means of line 62.

Operation, with reference to FIG. 2: Basically, the operation of the circuit of FIG. 2 is similar to that of the arrangement of FIG. 1. The primary difference is this: The limit switch of FIG. 1 has been replaced by the transistor T and the associated control circuitry.

Starting first from the rest position of belt 73, that is, the belt completely rolled up on the roller 69, the user may then grasp the end latch of the belt and pull it off, causing movement of the traveling nut 71 (FIG. 3) to the left, and closing of the spring position switch S3 towards the left, that is, switch contact 39 connected to terminal 40. Relay winding R2 is energized and motor M is energized by connection over transfer switches r21 and r22 between the main supply bus 10 and ground or chassis. The motor will rotate the spring housing 66 and belt 73 can be pulled off. Relay winding R1 does not carry current although the limit switch S1 will be closed, since capacitor 52 is already charged over the resistors 50, 51 and switch S1. No base current will flow to the transistor, and thus the transistor will in effect be an open circuit. When the belt is connected to the belt lock, that is, when it is latched, switch S1 will open. Connected 52 will discharge over resistors 50, 51 and 54. Relay winding R2 remains energized over the NO contact 12 and the movable terminal 14 of the switch-over contacts r22, diode 24 and spring position switch S3 until the motor M has paid out so much belt length that the tension on the belt decreases and the switch S3, due to decreasing belt tension, will open. Thus, the arrangement according to FIG. 2 also prevents full stressing of the spring when the belt is pulled rapidly off the supply roll, and continued stressing of the spring due to premature disconnection of the motor. Only when the spring position switch S3 has reached its center position will relay winding R2 become de-energized. Movements by the user, with the belt applied, are permissible within the spring characteristics of the spring, causing excursion of nut 71, and hence of the center contact 39 only to such a minor extent that the terminals 40, 41 ae not engaged. These movements are permissible, and bias applied on the belt is solely due to the spring. Yet, if the movements exceed a predetermined limit, the belt will be re-tensioned, if necessary, by the electric motor. If the belt should be rolled out or pulled off too far, switch S3 will switch to its right closed position, that is, to the fixed contact 41 (FIGS. 2, 3) to close the circuit to the motor M with polarity opposed to that previously supplied. Thus, the motor will tend to wind up pulled-off belt on the roller arrangement 69 until the spring tension reaches the predetermined value, and the spring position switch S3 again reaches its center, OFF position. Thus, excessive belting which has previously pulled out is rolled off again not solely by the spring, under control of its tension, but rather, primarily, by the electric motor M.

When the latch is opened, that is, when the belt is removed from its belt lock, latch switch S1 will again close. Capacitor 52, then discharged, and resistor 51 will have a pulse applied thereto to provide control current to transistor T which will become conductive and energize relay winding R1. The relay contacts r11 and r12 will transfer. The closed switch S1 (belt removed), movable contact 28, NO contact 27 of terminal r11, resistor 57, 53 provide a closed circuit to hold the transistor T conductive, and thus maintain energization of relay winding R1. The spring position switch S3 is not used at this time, and the network controlled by switch S3 is disconnected by the switch contacts r11. The motor M is energized, however, in the direction to roll on, or wind up the belt 73 as follows: Contact 59 of transfer switch r12, low-resistance resistor 53. Motor M continues to wind the belt on the roller arrangement 69. When no belt is left, the rotor of the motor will be blocked. This substantially increases current through the motor until it reaches approximately short-circuit current, causing a substantially higher voltage drop across resistor 53. This voltage applied to the emitter of transistor T is sufficient in order to block the transistor. Resistors 50, 57, forming a voltage divider, must be suitably dimensioned to obtain this effect. Transistor T will then block, relay winding R1 will be de-energized, and the self-holding circuit formed by the relay terminals r11, r12 will drop out, separating the motor from power supply. This terminates a complete working cycle, starting from the belt in rest position being pulled out, engaged in the latch, removed from the latch, and then again returned.

The self-locking, or self-binding gearing 64, 65 (53) has the advantage that the working point of the spring 67 can be determined thereby. Such gearing is a commercially available item and permits omission of separate locking arrangement, or one-way clutch, which otherwise would be necessary in order to stress the spring 67. The locking of the belt at a predetermined position, that is, without recourse to the spring in case of an impact, is obtained by a well-known separate impact or inertia lock, as customarily used in presently commercially available automatic automotive safety belt arrangements.

The spring position switch S3, in combination with the electric motor drive, permits pre-stressing the spring to a predetermined value. The stable center position of the spring position switch, which has three working positions — ON-left; OFF; ON-right, permits use of a simple network for the motor.

The electrical control system is additionally simplified by including the switch S1 at the latch. When the belt is not connected, the switch is closed. Upon connection of the belt, the switch is opened — an arrangement which can be mechanically simply combined with a fixed contact at the engagement element, cammed, or pressed away from a cooperating terminal by engagement of the belt latch. This switch provides current to the system and to the control network until the belt is engaged and, after removal of the belt, provides for connection of the motor M in a direction to wind up the belt due to the sudden pulse upon closing of the switch and consequent charging of capacitor C. This arrangement simplifies the circuit, particularly when the switch supplies current to the motor until disconnected by other means, and when the control circuit for the motor — in wind-up direction — includes a relay which responds to unlatching, or disconnection of the belt from its latch, that is, by the consequent pulse applied to the capacitor. The relay thus is energized by a dynamic connection, that is, by a short pulse, and can be held in position by a well-known self-holding circuit. The capacitor C provides the suitable charging pulse and by proper dimensioning of the relay with respect to the capacitor, reliable operation is ensured.

Various changes and modifications may be made within the scope of the inventive concept.

I claim:

1. Automatic safety belt system, particularly for vehicular use, comprising
a belt supply roller unit (69) having a shaft (68) to hold a belt (73) rolled on said unit and permit extension therefrom, the shaft rotating upon wind-up, and paying out of the belt (73);
a spring (67) coupled to the shaft to hold the belt under resilient spring tension;
and an electric motor (M) operatively coupled to the roller unit to effect wind-up of the belt thereon,
wherein the improvement comprises
a drive train (63, 64, 65, 66) mechanically serially connecting the motor (M), the spring (67) and the shaft (68) of the roller unit to permit resilient extension, or retraction of the belt against tension of the spring with approximately uniform belt tension characteristics regardless of the length of extension of the belt from the roller unit.

2. System according to claim 1, wherein the drive train comprises a self-locking gearing (64, 65) permitting transmission of rotational power from the motor (M) to the shaft (68) of the roller unit (69) but not in the reverse direction.

3. System according to claim 1, further comprising an impact lock (74) connected to the supply roller unit (69) and inhibiting rotation of the shaft (68) in the event of an impact against the unit.

4. System according to claim 1, further comprising a spring control switch (S3) coupled to the spring (67) and responsive to change switching state upon change in spring tension from a predetermined value.

5. System according to claim 4, wherein the spring position switch is a three-position switch having a first state indicative of the spring having a predetermined tension; a second state indicative of the spring being excessively stressed; and a third state indicative of the spring being under-stressed.

6. System according to claim 5, wherein the drive train comprises a first gear (64) driven by the motor (M); a spring housing (66) driven by said first gear and having one end of the spring (67) connected thereto, the other end of the spring being connected to said shaft (68) and wherein the spring control switch (S3) comprises means (72) responsive to deflection of the housing (66) upon changes in spring tension from a predetermined value.

7. System according to claim 6, wherein the spring is a spiral spring; a traveling nut (71) is provided, threaded on said shaft (68) and movable axially upon relative rotation of the spring housing (66) with respect to said shaft (68) upon over-stressing, or under-stressing of the spring, said traveling nut (71) engaging the means controlling the switch (S3) to effect changing of said switch from the first state, when the spring has the predetermined tension, to either the second, or third state upon over-stressing or under-stressing of the spring.

8. System according to claim 1, further comprising an end position limit switch (S2) changing state when the belt (73) is essentially completely rolled up on the roller unit (69).

9. System according to claim 1, further comprising an electronic integrated circuit end limit switch system connected to and controlled by current flow through the motor (M) and sensing when the motor has completely rolled the belt (73) on the roll-up unit.

10. System according to claim 9, wherein the electronic integrated circuit end limit switch system comprises means (53) sensing current flow through the motor (M); means ($T_3$, 50, 57) sensing current flow through the motor under blocked-rotor condition indicative of roll-up condition of the belt and controlling disconnection of the motor when sensing blocked-rotor condition indicative that the belt has reached its roll-up limit.

11. System according to claim 1, further comprising a belt latch switch (S1) in normally closed condition, and opening upon engagement of the belt with its belt latch, said belt latch switch being connected to and controlling current supply to the motor prior to engagement of the belt latch upon pull-off of the belt (73) from rolled-up condition on the roller unit (69) and controlling current supply to the motor after opening of the latch and consequent re-closing of said latch switch.

12. System according to claim 11, further comprising a control circuit for said motor including a capacitor (C) connected to said belt latch switch (S1), and means sensing the charge pulse being applied to said capacitor upon opening of the belt latch and consequent closing of the belt latch switch, said means being connected to control energization of the motor to turn in a direction tending to wind up said belt.

13. System according to claim 11, further comprising a control circuit for the motor (M) including a relay (R1, r11, r12), said relay being connected to the belt latch switch (S1) and dynamically controlled thereby when the belt latch switch changes from open to closed state upon opening of the belt latch when a previously engaged belt is released.

14. System according to claim 1, further comprising a housing (66) for said spring (67), said spring being a spiral spring and having one end thereof secured to the housing and the other end to the shaft (68) of the roller unit (69) to which said belt is attached; an impact lock (74) coupled to the shaft (68) and restraining rotation of the shaft upon sensing of an impact;
said drive train comprising a self-binding worm gear drive (64, 65) connecting the motor shaft to the housing (66) of the spring (67), said housing forming a portion of the mechanical series connection between the motor (M) and the shaft (68) of the roller unit (69);
a traveling nut (71) threaded on the shaft and restrained against rotation with respect to the housing (66);
a three-position switch (S3) operated by said traveling nut (71) and located in fixed axial position with respect to said housing (66), said switch (S3) having a center, or off-position when the spring (67) connecting the housing (66) and the shaft (68) has a predetermined stress applied thereto, and permitting relative rotation of the housing (66) with respect to the shaft upon under-stressing or over-stressing of the spring with consequent movement of the traveling nut, such consequent movement effecting connection of the switch (S3) with one or another end terminal indicative of over-stressing, or under-stressing of said spring (67);
and a motor control circuit connected to and controlled by said switch (S3) controlling rotation of the motor in a direction tending to restore the traveling nut (71) to a position centrally of said contacts (40, 41) to place said spring (67) in the position having said predetermined stress.

15. System according to claim 14, further comprising an end position limit switch (S2) charging state when the belt (73) is essentially completely rolled up on the roller unit (69).

16. System according to claim 14, further comprising an electronic integrated circuit end limit switch system connected to and controlled by current flow through the motor (M) and sensing when the motor has completely rolled the belt (73) on the roll-up unit.

17. System according to claim 14, further comprising a belt latch switch (S1) is normally closed condition, and opening upon engagement of the belt with its belt latch, said belt latch switch being connected to and controlling current supply to the motor prior to engagement of the belt latch upon pull-off of the belt (73) from rolled-up condition on the roller unit (69) and controlling current supply to the motor after opening of the latch and consequent re-closing of said latch switch.

* * * * *